(12) United States Patent
Shankar et al.

(10) Patent No.: US 8,473,111 B1
(45) Date of Patent: Jun. 25, 2013

(54) INTERCONNECTED PREMISES EQUIPMENT FOR ENERGY MANAGEMENT

(75) Inventors: Chelakara P. Shankar, Dayton, MD (US); Steve Dusse, Woodside, CA (US)

(73) Assignee: American Grid, Inc, Calverton, MD (US)

( * ) Notice: Subject to any disclaimer, the term of this patent is extended or adjusted under 35 U.S.C. 154(b) by 0 days.

(21) Appl. No.: 13/339,127

(22) Filed: Dec. 28, 2011

Related U.S. Application Data

(63) Continuation of application No. 11/548,222, filed on Oct. 10, 2006, now Pat. No. 8,095,233.

(60) Provisional application No. 60/724,808, filed on Oct. 11, 2005.

(51) Int. Cl.
*G06F 19/00* (2011.01)
(52) U.S. Cl.
USPC ............................... 700/293; 700/295; 702/61
(58) Field of Classification Search
USPC .... 700/293–295, 22, 20, 19, 12–13; 705/412; 702/61–63, 188; 324/412
See application file for complete search history.

(56) References Cited

U.S. PATENT DOCUMENTS

| | | | |
|---|---|---|---|
| 4,644,320 A * | 2/1987 | Carr et al. ................... 340/12.37 |
| 6,631,309 B2 * | 10/2003 | Boies et al. ................... 700/291 |
| 6,828,695 B1 * | 12/2004 | Hansen ........................... 307/31 |
| 2002/0072869 A1 * | 6/2002 | Stiller .............................. 702/90 |
| 2002/0120369 A1 * | 8/2002 | Boies et al. ................... 700/291 |
| 2004/0138981 A1 * | 7/2004 | Ehlers et al. ..................... 705/36 |
| 2005/0116836 A1 * | 6/2005 | Perry et al. ............... 340/870.02 |
| 2006/0124483 A1 * | 6/2006 | Williamson .................. 206/337 |

\* cited by examiner

*Primary Examiner* — Kidest Bahta
(74) *Attorney, Agent, or Firm* — Hogan Lovells US LLP

(57) ABSTRACT

Energy commodities in the form of electricity and combustible fuel (e.g. natural gas, propane) are used by appliances in a fashion which is monitored and controlled through a Premises Energy Management System (PEMS). The system facilitates direct monitoring and control of energy-consuming appliances, in real time, utilizing automated programmatic control and a plurality of human interfaces including local display and control, email, web browser, text messaging, and integrated voice response (IVR). A Monitoring and Control Coordinator (MCC) provides centralized coordination of functions and one or more Communicating Appliance Interfaces (CAI) interacting with energy consuming appliances are interconnected via wired and wireless communication networks and protocols. The system may retrieve information from third parties, such as weather services, for optimizing energy usage. An interface may be provided to the energy provider/purveyor to enhance the provision of energy by providing additional real-time services such as demand management and service outage management.

21 Claims, 9 Drawing Sheets

INTERCONNECTED PREMISES EQUIPMENT FOR ENERGY MANAGEMENT

RELATED APPLICATION DATA

This application is a continuation application of U.S. patent application Ser. No. 11/548,222 filed Oct. 10, 2006, now U.S. Pat. No. 8,095,233, which further claims priority to U.S. Provisional Patent Application No. 60/724,808 filed on Oct. 11, 2005, the subject matter of which is hereby incorporated by reference in their entirety.

BACKGROUND OF THE INVENTION

1. Field of Invention

This invention relates to managing the consumption of an energy commodity within premises. More specifically, the invention relates to direct monitoring and control of energy-consuming devices via centralized programmed control as directed by a consumer or by the provider of the energy commodity via one or more local and remote user interfaces.

2. Brief Description of the Prior Art

Control of energy-consuming appliances has historically been implemented through local controls provided by the appliance manufacturer, where the term "appliance" is used generically herein to refer to a device coupled to an energy provider's supply system. Such control has generally been facilitated at each individual appliance in a manner appropriate for that appliance. Such implementations, however, neither provide for control of appliances anywhere other than locally nor provide control in a manner to account for pertinent external factors such as weather, time-dependent cost of energy or a consumer's unanticipated change of schedule.

To overcome the lack of remote control capability, add-on devices were developed to control individual appliances remotely via a particular communications protocol. For example, remote control power supplies for network servers via a serial communications protocol is known as are telephonic interfaces that allow dialing in to an auto-answer appliance controller. Several home automation products exist which allow control of appliances remotely via programmed schedules and wireless handheld controls. Such devices are restricted in their remote control capabilities in that they are generally implemented through proprietary human interfaces with limited to no user option as to how the controller may communicate with the controlled device.

The vast majority of energy-consuming appliances have no means for monitoring or measuring the amount of energy being consumed by the appliance at a given time. While auxiliary devices exist which can measure the amount of energy being consumed by an individual appliance, such devices generally have neither the capacity to make the consumption data available in a centralized manner for multiple appliances nor the capability to report this information to the consumer anywhere other than at the device itself. Additionally, such devices do not consider time-varying costs of energy and, thus, actual energy costs or savings are not readily apparent to the user.

Software applications exist which guide a consumer through an "energy audit" of their premises. Such auditing extrapolates energy use for the premises as a whole from the estimated amount of energy used by each appliance. The overall energy usage is not formulated from real-time data obtained from the appliance, but rather by approximations of energy usage based on the size and type of appliance. Prior art software applications further fail to take into account the time variant consumption of energy by each appliance and allow presentation of the data only through the application's user interface.

Thermostatic control of heating and air conditioning systems throughout premises are well known and widely used. Typically, such control systems are implemented through thermostats having simple controls for selecting levels of heating and cooling and for setting a desired "setpoint" temperature. Thermostatic controls generally are set through some manual action by the consumer each time a change in the control setting is desired. Such requirement of user intervention is highly ineffective in managing the heating and air conditioning of the user's premises due to the user's inability or reluctance to continually interact with the thermostat.

To overcome the inefficiencies of manual controls, thermostats have been developed that automate the control of the heating and air conditioning by providing means for the consumer to create a static heating/cooling schedule so as to alleviate some of the continual user interaction requirements. Such devices are typically cumbersome to program, but must be programmed often, such as when seasons change or when change in lifestyle is desired. The user may thus procrastinate and allow much time to pass before reprogramming. Clearly, such systems are only as efficient as the user's ability and desire to perform the required programming. Certain programmable thermostats also allow for short term and long term disabling of the scheduled control, but these thermostats fail to implement an explicit reminder mechanism to compel the consumer to resume automatic scheduled function once it has been disabled. Typical programmable thermostats also lack remote access to the controls so that the user must be physically located at the thermostat to institute any change in the programmed environmental control policy.

Pool pumps also have been targeted for reduction in energy consumption. However, pool pump control is typically achieved via a programmable timer for selecting one or more periods during the day to operate the pool pump, thereby creating a static schedule for filtering the pool water. These devices operate in an open loop which does not take into account constantly changing ambient conditions that affect pool sanitation, such as the amount of sunlight incident on the pool, ambient temperature and amount of pool use. This shortcoming in control flexibility often leads to a situation where the consumer schedules the pool pump to run in accordance with worst case conditions, which requires the pump to operate longer than is necessary to sanitize the pool.

Certain energy providers have developed and deployed systems to reduce energy consumption in certain areas during periods where peak demand approaches production capacity. These systems typically consist of appliance controls that can interrupt the power to an appliance under the direct control of the energy provider, such as through unidirectional transmission of control signals originating at the provider to the control devices coupled to the appliances. In many cases, a local override mechanism is provided to allow a consumer to restore power to a device for which power has been interrupted by the energy provider. Often, such activation by the consumer is in conflict with a prearranged agreement with the provider and the location of such non-compliance cannot be isolated by the energy provider. Multiple devices within individual premises or multiple premises in a neighborhood are generally controlled together and, as such, all devices respond at once to each control signal. There is presently no mechanism available to the energy provider to allow control over energy consumption at individual devices or individual premises for purposes of high demand allocation of resources, or otherwise.

In light of the state of the art in energy monitoring and control, the need is apparent for more flexible management of energy use within premises.

SUMMARY OF THE INVENTION

In one aspect of the invention, an energy management system is provided for managing consumption of an energy commodity by energy-consuming devices at premises, where the energy commodity is provided to the premises by an energy provider. The system includes a plurality of appliance interfaces each respectively coupled to a corresponding one of the devices and monitoring a corresponding rate of consumption of the energy commodity provided thereto. The appliances are coupled one to another through a communication network. The system includes further a monitoring and control coordinator coupled to the communication network and to another communication network. The monitoring and control coordinator receives from each of the appliance interfaces over the communication network status information that includes an indication of said corresponding rate of consumption. The monitoring and control coordinator transmits to each of the appliance interfaces over the communication network corresponding control information for controlling the corresponding rate of consumption, where the control information corresponds to information received at the monitor and control coordinator over the other communication network.

In another aspect of the invention, the energy management includes a plurality of appliance interfaces each respectively coupled to a corresponding one of the devices and controlling the consumption of the energy commodity by the corresponding device responsive to control information provided thereto. A monitoring and control coordinator is coupled to the appliance interfaces through a local communication network and provides the control information to each of the appliance interfaces. The control information is determined from external information provided to the monitoring and control coordinator. The system includes a network communication device coupled to the monitoring and control coordinator through a wide area communication network and transmitting the external information thereto.

In yet another aspect of the invention, a method is provided for managing consumption of an energy commodity by energy-consuming devices at premises. Information pertaining to the consumption of the energy commodity is acquired by a monitoring and control coordinator through a communication network. The monitoring and control coordinator control transmits information to a plurality of appliance interfaces each respectively coupled to a corresponding one of the devices, where the control information is determined from the acquired information. Consumption of the energy commodity is controlled for at least one of the devices in accordance with the control information.

DETAILED DESCRIPTION OF PREFERRED EMBODIMENTS

Figure 1:
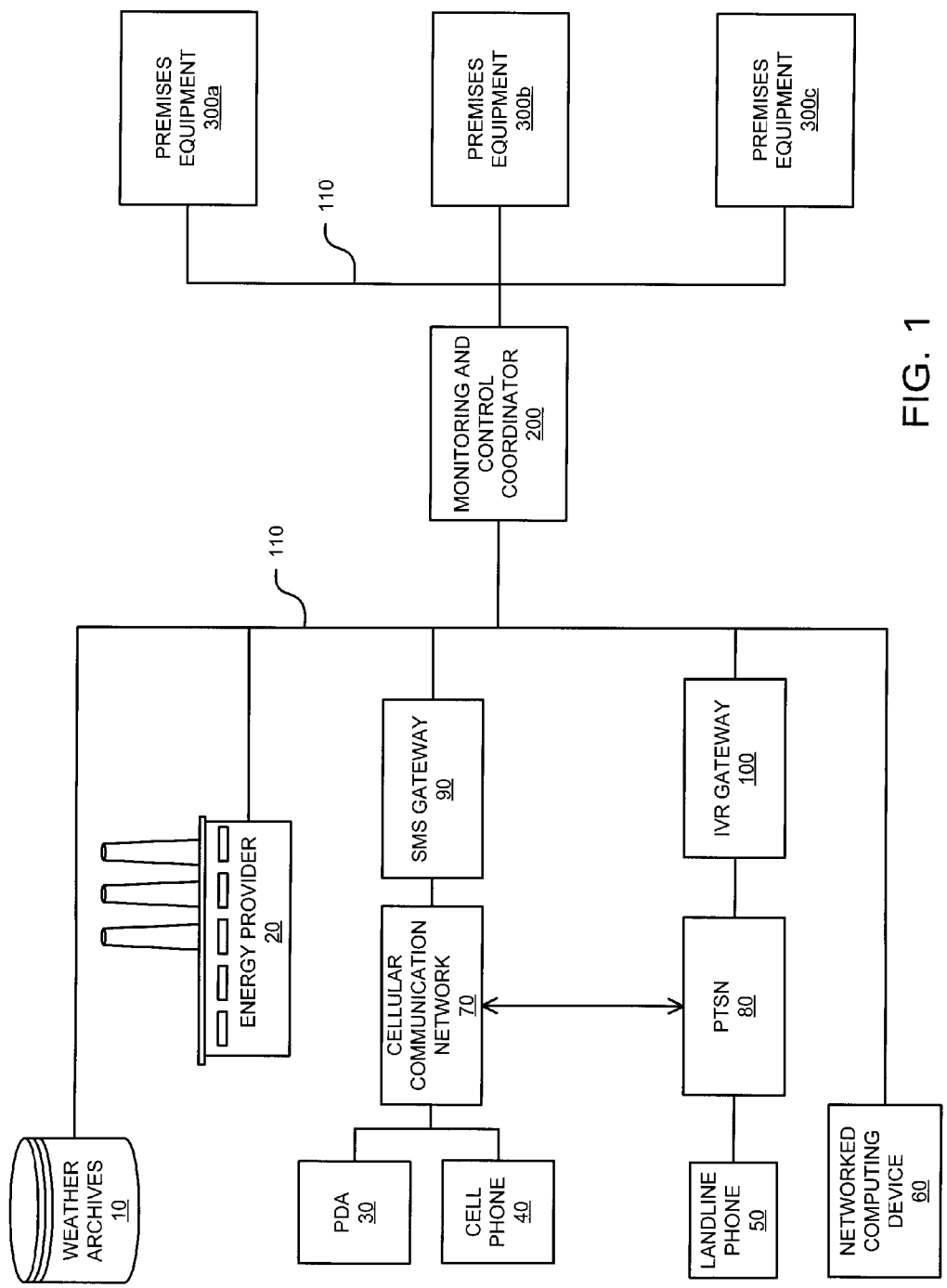
FIG. 1 is a block diagram of an exemplary Premises Energy Management System in accordance with the present invention.

The present invention forms a network of interconnected energy-consuming appliances within individual premises to control the consumption of an energy commodity either locally at the appliance or remotely using standard devices with which a consumer already has access and familiarity, such as a web browser or a cell phone. As used herein, an "energy commodity" is a consumable product provided to premises by an energy provider to operate energy-consuming equipment on the premises in exchange for payment of a market price. Such energy commodities include electric power, as provided over a power grid, natural gas, as provided through a pipeline, and others. It is to be understood that energy commodities may be stored locally to the premises, such as through gas tanks and storage batteries. Automated control of consumption of the energy commodity may occur in accordance with expressed preferences and schedule of the consumer, in accordance with requirements of the provider of the energy commodity, as well as in accordance with external factors such as a current cost of energy, the current time of day and weather conditions.

The invention further incorporates monitoring and measurement means to monitor the energy usage of an entire premises as well as of individual connected appliances. The measured data obtained may then be used to present real-time information to the consumer in a variety of display formats regarding the energy usage in terms of for example, estimated cost of the energy based on a tiered rate, time-varying energy costs, energy savings achieved subsequent to installing the inventive system, and other energy related information such as energy cost savings, Green House Gas (GHG) emissions reduced, and GHG environmental impact reduced. Energy usage information may be used to determine such pertinent and useful parameters as relative energy use among various appliances, cost of energy at per-appliance granularity, and any change in energy use from one time period to another. The invention allows such information to be displayed both locally at the premises at which the appliance is located as well as on a remotely located device.

Certain embodiments of the invention implement control of heating and air conditioning of the premises in a fully automated manner. A graphical interface may be provided to facilitate intuitive programming of heating and air conditioning schedules and various remote control mechanisms are provided to facilitate unanticipated changes in scheduling, such as in response to varying weather or cost of energy. A notification system may be provided to alert the consumer to various system states, such as a disabled thermostat schedule function. By way of beneficial features of the invention, the consumer may then resume automatic scheduled control from a remote device, such as a cell phone or networked computer.

The present invention may control pool filtration pumps to achieve a desired level of filtration. The system takes into account static factors, such as the size of the pool and the size of the pump, as well as dynamic factors, such as the frequency of pool usage, weather, and amount of sunlight, to optimize the usage of energy with respect to sanitation.

The present invention may be embodied to provide information to the energy provider to reduce energy consumption in response to peak demand events. The energy provider may be provided with an interface which can be used to aggregate the energy usage information from multiple premises, notify select consumers of peak demand events, and verify consumer compliance with demand reduction efforts at per-appliance granularity.

Referring to FIG. 1, there is shown an exemplary embodiment of a Premises Energy Management System (PEMS) consistent with the present invention. The PEMS of the present invention monitors and controls the consumption of an energy commodity by equipment on premises. As is shown in the Figure, a Monitoring and Control Coordinator (MCC) 200 is coupled to equipment 300a-300c at target premises to monitor and control end use appliances within those premises through a wide area communication network 110. The MCC 200 further allows consumer interaction with the Premises Equipment through various interfaces, as will be described below. The MCC 200 may be in communication with equipment at single premises or at multiple premises with no limitation as to the number of premises. The MCC 200 may be located at particular premises, may be located at the facilities of the energy provider 20 or may be at another location, such as at the location of a third party contracted to maintain the system.

The MCC 200 communicates with the Premises Equipment via a communications network 110 operating under a communication network protocol, such as the Transmission Control Protocol/Internet Protocol (TCP/IP) suite. The communications network 110 may optionally include one or more Telecommunications Service Gateways (TSG), 90, 100, for the MCC 200 to interact with end consumers through devices that are not directly compliant with TCP/IP communications. Thus, the term "gateway" is used herein in the traditional sense, namely means for coupling networks operating under different communication standards or protocols; each TSG provides a translation function from the exemplary TCP/IP communications to another form of communications that is related to an end-use communications device. FIG. 1 depicts two such gateways, a Short Message System (SMS) Gateway 90 and an Integrated Voice Response (IVR) Gateway (100). SMS Gateway 90 translates information formatted to be TCP/IP compliant to a known communication protocol utilized by a Cellular Communications Network 70 for transmitting and receiving text messages, which allows the MCC, in certain embodiments, to send information to an end consumer that can be displayed on a cellular phone 40, Personal Digital Assistant (PDA) 30, or other SMS-enabled end communications device. This further enables the MCC 200 to receive information from the end consumer transmitted by the end consumer using the SMS feature on the end consumer's cellular phone 40, PDA 30 or other end communications device. Control messages may be interpreted by a suitable message parsing function at MCC 200, where such messages would be in a format appropriate to the specific application. Such text command parsing and decoding is known and will not be further described herein.

The IVR Gateway 10 translates information from the protocol of network 110, e.g., TCP/IP, to a protocol suitable for telephonic voice networks to effect audio interactions with end consumers. It is to be understood that telephonic communications may also be conducted through the use of discrete tones generated by the communication device itself. The end consumer may interact through any telephone designed for two way audio communications. Wired phones, or "landline" phones, are enabled through automated switching of the audio information through a Public Switched Telephone Network (PSTN) 80. Cellular phones 40 are enabled through routing of audio information through a Cellular Communications Network 70. The invention is not limited to specific implementations of telephonic networks and the configurations of the telephonic networks illustrated in FIG. 1 are not intended to limit the scope of the invention. Also, as is shown in FIG. 1, communication may occur concurrently using both Cellular Communication Network 70 and PTSN 80, by appropriate routing and switching of information between networks. Moreover, is to be understood that the invention is not limited to the exemplary gateways illustrated and described; other protocol translations are intended to fall within the scope of the present invention.

The MCC 200 may optionally interact with end consumers via a networked computing device 60 which participates in network communications through applications executing in accordance with the network protocol. A networked computing device 60 may be, but is not required to be, an ordinary desktop personal computer (PC), minicomputer, mainframe computer or may be a portable device such as a laptop computer or handheld computing device, such as a palmtop computer or even a multimedia player. It is to be understood that the networked computing device 60 may operate under the network protocol in a wireless medium through suitable wireless communication techniques. A typical configuration for the networked computing device includes a suitable output device for audio or visual display of information and one or more suitable input devices for capturing input from an end consumer. The combination of the output device and the input devices may implement, through appropriate processing instructions executing on the networked computing device, a graphical user interface. In certain embodiments of the invention, the graphical user interface may be implemented by a Web browser communicating in accordance with a message passing or request/response protocol, such as the Hypertext Transfer Protocol (HTTP). The communication may also occur under other message passing or request/response protocols, such as the Simple Mail Transfer Protocol (SMTP), the File Transfer Protocol (FTP), and Post Office Protocol version 3 (POP3), as well as others. Applications operating on the consumer's device communicate through the network communication protocol, such as TCP/IP, and operate in accordance with the message passing or request/response protocol at the end consumer's device to decode, for example, status data and to encode user input into status request or control command data. For example, a Web browser application may present data requested by an HTTP "GET" command from the MCC 200 and subsequently display on the computing device 60 the retrieved information in appropriately formatted text and graphical indicia through a suitable markup language, such as the Hypertext Markup Language (HTML). Similarly, the Web browser may capture keyboard and mouse input to form requests and commands which are transported to the MCC 200, where they are parsed and acted upon. In another embodiment of the invention, an SMTP or POP3 client application may present textual and graphical information from the end consumer and capture textual input through appropriately formatted email messages. It is to be understood that these exemplary applications are intended to show possible message and command passing schemes suitable for use with the invention and are not intended to limit the scope of the invention in any way.

The MCC 200 may optionally interact with a computer or other device implementing suitable communication functions within the facilities of the energy provider 20. The MCC 200 may provide information to the energy provider 20 including, but not limited to information pertaining to the end consumer's energy use within the premises as measured by the Premises Equipment 300. The MCC 200 may also request information from the energy provider 20 including, but not limited to information pertaining to the end consumers past and present billable energy use as measured by the energy provider, information pertaining to the cost of energy in the form of energy pricing to end consumers, information pertaining to the relationship between the energy provider's energy supply and energy demand, in particular, when the demand is presently, or is predicted to be, at or near the provider's capacity, i.e., the provider's maximum load.

The MCC 200 may be optionally coupled to one or more information providers through the communication network 110. For example, as is shown in FIG. 1, information may be obtained from weather data archives 10 maintained by a weather data service. Such service providers are known to provide weather data over TCP/IP via the World Wide Web or over other Internet applications, where the weather data includes, but is not limited to current weather measurements, weather forecasts, historical weather information, pollen count information and weather event warnings and advisories. The MCC 200 may also provide information to the weather data service pertaining to current weather data as measured by the Premises Equipment 300. It is to be understood that many other information providers exist and the other types of information may be used in various embodiments of the present invention. Moreover, such information may be included merely to inform the user by way of the user interface and may not necessarily be used in the management of energy consumption. However, as the consumption of energy at premises is impacted by a wide range of factors, the invention contemplates the use of any such information as provided over the communication network 110.

It is to be understood that MCC 200 may be in communication with Premises Equipment 300a-300c through communication network 110 even when energy-consuming devices on the premises have been removed from the energy provider's distribution means, or vice-versa. For example, the premises equipment may be embodied by, say, an electric car, which periodically receives its charge through electricity from a provider provided through a charging station. In such embodiments, the MCC 200 may still communicate with the premises equipment in accordance with the invention even after the vehicle has been removed from the charging station. Similarly, such communication can occur when the provider has removed power from the energy-consuming device.

Figure 2:
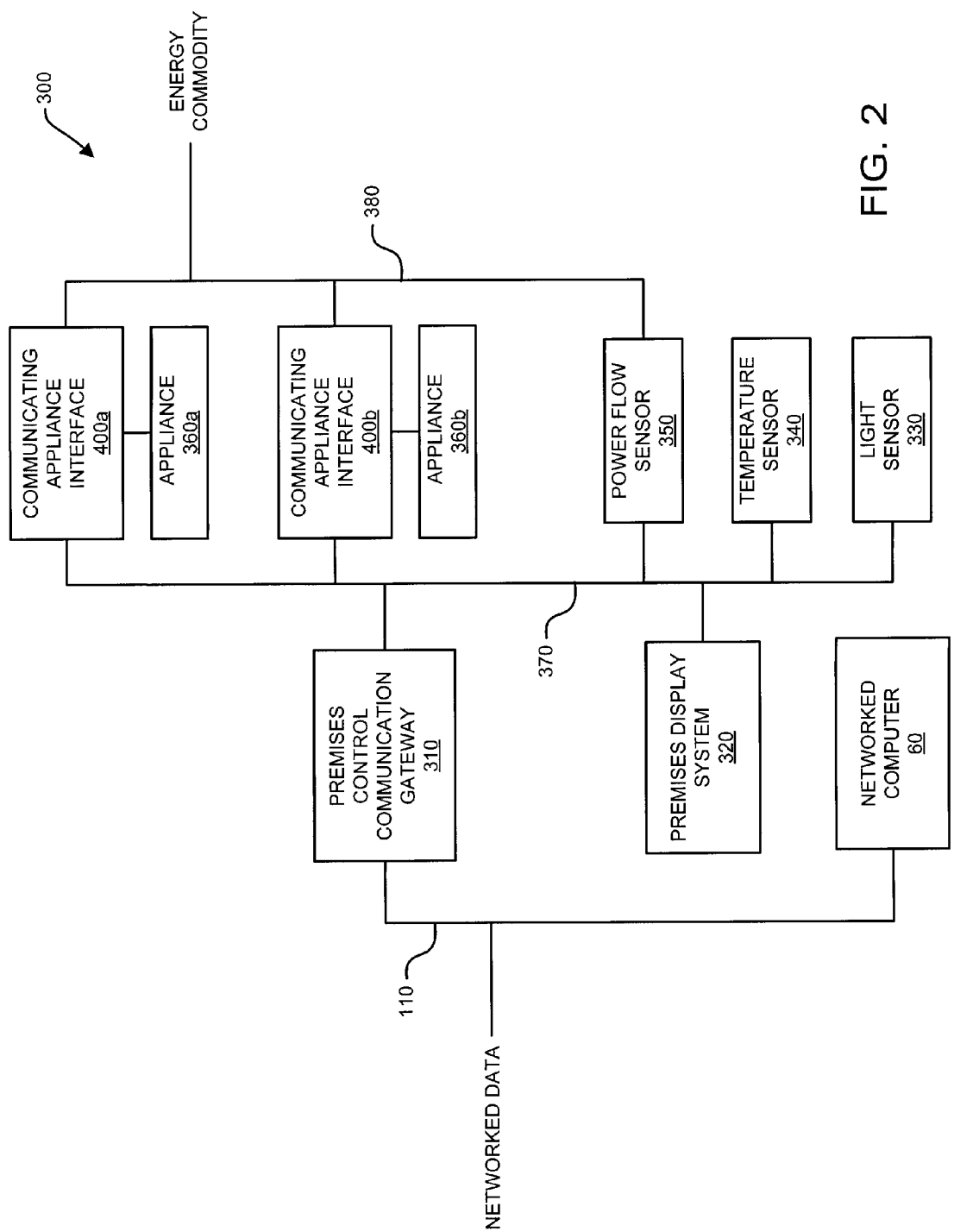
FIG. 2 is a block diagram of an exemplary configuration of equipment components residing at the target premises in accordance with aspects of the present invention.

FIG. 2 depicts exemplary target premises 300 equipped in a manner consistent with the present invention. The Premises Equipment 300a-300c, illustrated in FIG. 1, may include any combination of features illustrated in FIG. 2 and other suitable devices for carrying out the present invention.

As is shown in FIG. 2, an optional Premises Control Communications Gateway (PCCG) 310 translates monitoring and control data, and other information, from communication network 110 to a Premises Area Network (PAN) 370. The PAN 370 is a local area network that interconnects the various devices, interfaces and sensors of the premises for communicating status and control data there between. The PCCG 310 may optionally include local processing capability, control logic and local data storage, or any combination thereof, to facilitate uninterrupted monitoring and control of Premises Equipment in the event of an interruption in network communications with the MCC 200. Where the interfaces and sensors within the premises are able to communicate directly one with another via the network protocol of network 110, the PCCG 310 may be omitted and the PAN 370 will be operable directly with the network 110.

The Premises Equipment 300 may include one or more networked computers 60 to interface the system to the inhabitants of the premises. Additionally, there may be one or more Premises Display System (PDS) 320 located throughout the premises. The functions provided by the PDS 320 may be embodied in a single hardware device or integrated into one or more of the other interfaces or sensors including, but not limited to, the PCCG 310 or the Communicating Appliance Interfaces 400a-400b, described below. A PDS 320 provides an alternate user interface to the consumer and may be implemented in a suitable manner, such as through a processor executing a graphical user interface and coupled to a touch sensitive display, or other suitably configured interface device.

Various sensors are optionally located throughout the premises in such a way as to measure some physical quantity within or around the premises. The sensed data may then be reported to other system components via the PAN 370. Thus, the sensors have detectors coupled to suitable signal processing and communication equipment so that the sensed data may be transmitted over the PAN 370. FIG. 2 depicts three types of sensors, as discussed below, but it is to be understood that the invention is limited neither to a single instance of a particular type of sensor nor to the specific types of sensors shown in the exemplary embodiment of the Figure. It is to be noted, also, that the sensors may be embodied as a separate hardware device or may be integrated into one or more of the other interfaces and sensors including, but not limited to, the PCCG 320 and the Communicating Appliance Interfaces 400a-400b, which are described further below.

As is shown in FIG. 2, Premises Equipment 300 may include one or more optional light sensors 330 to determine the amount of light present in particular regions of the premises. If a light sensor 330 is located near an outside window, it can be used to determine the amount of sunlight present at a particular time during the day. A light sensor 330 may also be used to determine the activation status of lighting loads within the premises. Additionally, a light sensor 330 may determine the amount of sunlight impinging on the water of a pool, so as to activate the pool pump when sunlight may be affecting the level of sanitation of the pool.

Premises Equipment 300 may include one or more optional temperature sensors 340 to determine the temperature in particular areas of the premises. For example, a temperature sensor 340 may be located immediately outside the premises to determine the ambient outdoor temperature. A temperature sensor 340 may also be placed in the water of a pool or spa to determine the temperature thereof as part of the filtration control procedure.

As shown in FIG. 2, Premises Equipment 300 may include one or more optional power flow sensors 350 to determine the amount of power being locally consumed. A power flow sensor 350 may be connected to the energy supply or delivery system 380 of the premises to measure the amount of power that flows through a particular point of attachment. The power flow sensor 350 is configured to sense the consumption of the applicable commodity, e.g., electrical power consumption, combustible fuel consumption or consumption of some other energy commodity. The consumption information is then relayed to other components of the system over PAN 370. The power flow sensor 350 may also be equipped with certain detectors and processing equipment to determine various metrics pertaining to the quality of the energy supply. By varying the point of attachment of the power flow sensor 350, the energy can be monitored for the entire premises, for one or more areas of the premises or for one or more energy-consuming devices.

The present invention may incorporate other sensors that can be located at the premises to include occupancy sensors for determining if occupants are present, audio sensors to determine the presence of particular audio events, window and door sensors to determine the open/closed status of windows and doors, and proximity sensors to determine the presence or absence or certain mobile devices or equipment. Such other sensors may be used to provide auxiliary status information to the user, for example, through the PDS 320, or may be used to determine energy related parameters, such as to turn off a heater when a window or door is open.

As is shown in FIG. 2, Communicating Appliance Interfaces (CAI) 400a-400b are optionally located throughout the premises and are connected to an energy-consuming appliance 360a-360b at various points along the energy supply system 380. As previously stated, an appliance can be embodied in any energy consuming device attached to the energy supply and not just typical household appliances. For example, the appliance 360a may be a refrigerator and the appliance 360b may be a pool pump. Further, it is to be noted that while only two CAIs 400a-400b and associated appliances 360a-360b are illustrated in FIG. 2, any number of CAIs and appliances may be included in the Premises Equipment 300. Moreover, Premises Equipment 300 may include appliances that are coupled to energy supply system 380, but not to a CAI. The present invention may monitor the energy consumed in different portions of the energy supply system 380, such as through a properly placed power flow sensor 350, and control the consumption of appliances controllable through a CAI, as described below, so as to compensate for an uncontrolled appliance, where practical.

The CAIs 400a-400b monitor and optionally control the energy consuming functions of the particular device to which they are connected. The CAIs 400a-400b may be coupled to the device 360a-360b through a corresponding generic connection applicable to the energy supply 380. For example, a CAI may incorporate an electrical outlet through which the corresponding appliance receives its power. Alternatively, the CAI may be specific in form and function for the particular appliance to which it is connected. For example, a CAI may have the necessary control equipment to operate heating, ventilation and air condition (HVAC) equipment. Each CAI 400a-400b contains suitable processing equipment to communicate to other system components via the PAN 370 so as to send status information and receive control information pertaining to the particular controlled energy consuming appliance 360a-360b. An exemplary CAI is described in further detail below.

Figure 3:
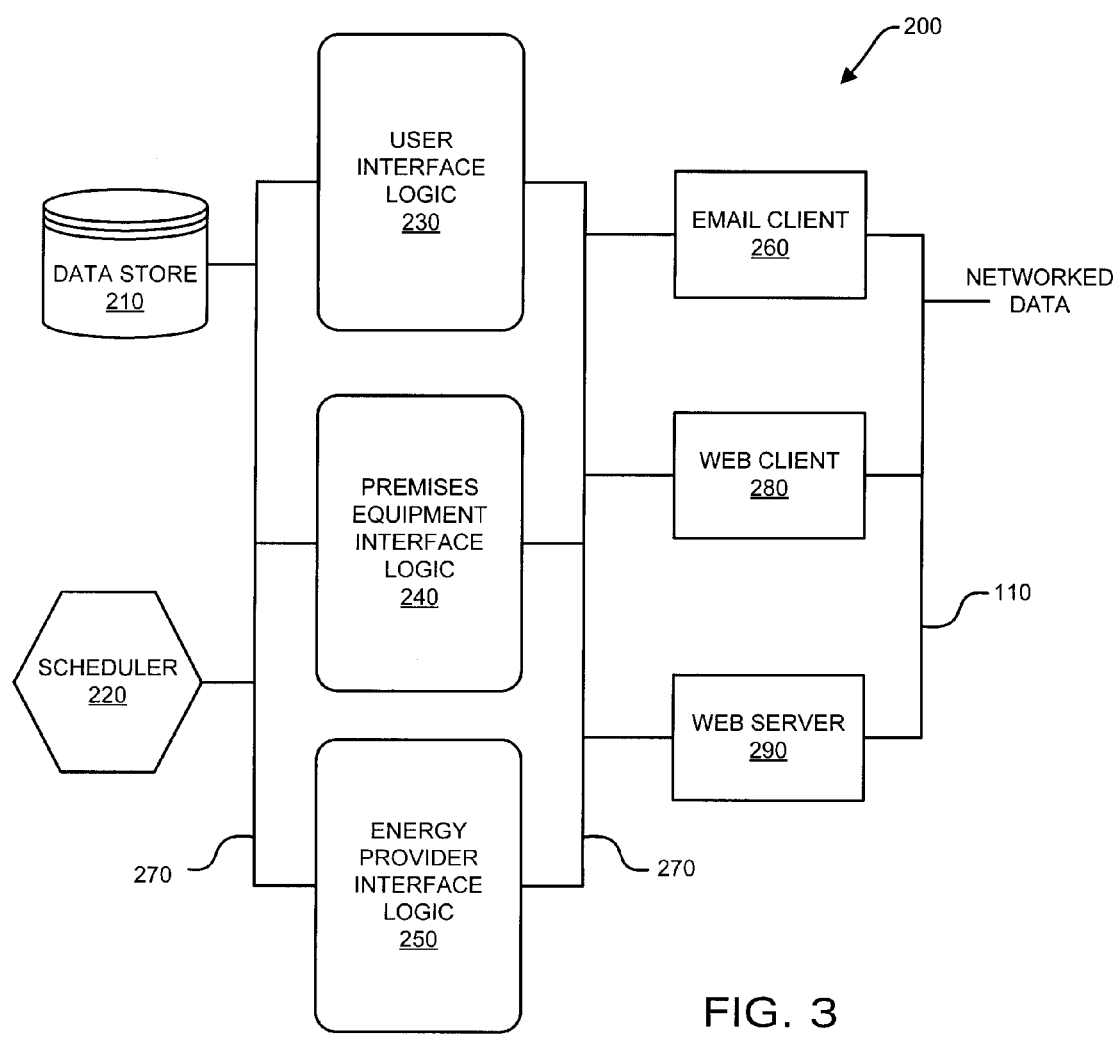
FIG. 3 is a block diagram of an exemplary configuration of internal components to embody a Monitoring and Control Coordinator consistent with the present invention.

Referring now to FIG. 3, there is shown an exemplary configuration of components to implement a Monitoring and Control Coordinator (MCC) 200 consistent with the present invention. The MCC 200 may be embodied in any suitable combination of hardware and software. For example, the MCC 200 may be implemented on a single processor computer or may be implemented in a distributed manner over multiple computers or computer servers. The various components of the MCC 200 may be interconnected through an Inter-Process Communications (IPC) bus 270 known in the inter-processor communication art. Further, the components of the MCC 200 may be located together at a single location or may be physically distributed at various locations, including but not limited to the premises to be controlled, the facilities of the energy provider 20, or the facilities of a third party service provider.

In certain embodiments of the invention, MCC 200 includes a data store 210 for logging, persistently retaining and recalling information used by the system. Scheduler 220 implements a timer function, which is used to initiate execution of various processes and transactions at predetermined times and intervals. The functions of the data store 210 and scheduler 220 are typical and may be implemented by mechanisms known in the art. The contributions to various aspects of the invention by the data store 210 and scheduler 220 will be apparent to the skilled artisan without elaboration as to the details thereof.

MCC 200 incorporates logical units to facilitate and define various functional aspects of the invention. The logical units may be implemented in hardware or software on a general purpose computer, on a dedicated processor or on some combination thereof. Whereas, the logical units will be described herein in terms of discrete components for convenience and clarity, the logic may be distributed, such as when implemented in concurrently executing threads in a suitable multithreaded computing environment. Moreover, other logical units may be incorporated depending on the application. For example, certain embodiments may include interface logic for a third party agent for implementing functionality specific to the agent's requirements.

As is shown in FIG. 3, certain embodiments of MCC 200 include User Interface Logic 230 to implement a user interface to the system. The User Interface Logic 230 may include a display and input peripherals for implementing a local user interface or may be separated from the display and input peripherals to provide the user interface processing. In either case, the User Interface Logic 230 formats system information for presentation to the user in a manner suitable for the target presentation medium and solicits and accepts input from the user and either passes the input to the applicable system component through IPC bus 270 or directly executes an action responsive to the user input.

MCC 200 may include Premises Equipment Interface Logic 240 to facilitate transactions between the MCC 200 and the Premises Equipment 300. The Premises Equipment Interface Logic 240 produces information to send to the Premises Equipment in accordance with the end user's directions. The Premises Equipment Interface Logic 240 also receives periodic status information from the Premises Equipment 300 and determines what actions, if any, are required. Such actions may involve simply storing sensor data or may require generating command information to act in response to a system state determined from the sensor data and other data received at the MCC 200 over the communication network 110.

As is shown in FIG. 3, certain embodiments of the invention include Energy Provider Interface Logic 250 within the MCC 200 to facilitate interactions between the MCC 200 and the applicable data interface at the facility of the energy provider 20. The Energy Provider Interface Logic 250 periodically solicits and receives information from the energy provider 20 in accordance with the energy provider's available services to the end consumer. Information received from the energy provider may include cost of energy, consumer's current energy use and billing information, consumer's past energy use and billing information, and status of energy supply and demand. The Energy Provider Interface Logic 250 determines and executes procedures to store and optionally act upon this information. Additionally, the Energy Provider Interface Logic 250 may transmit information to the energy provider 20, such as energy outage status for individual premises and aggregated premises, and energy usage per appliance at individual premises and aggregated premises.

As is shown in FIG. 3, the MCC 200 communicates with the communication network 110 over a plurality of communications protocol interfaces, three of which are illustrated in the Figure. It is to be understood that the invention is not limited to the interfaces shown.

In certain embodiments of the invention, an Email Client 260 is used by the MCC 200 to generate an email message in accordance with SMTP for transmission to other system components. For example, email messages may be used to notify users of events that require the use's attention or action, various reminders including reminders for maintenance of system components or appliances, notifying energy providers 20 of events which require the energy provider's attention or action, and passing information through Telecommunications Service Gateways 90, 100 when the gateways are equipped to receive and process email messages and convert the messages to the protocol of the Cellular Communication Network 70 or the PTSN 80. The Email Client 260 may additionally fetch, receive and process email messages destined for the MCC 200 for purposes of, for example, receiving email from end users with information or instructions in reply to emails sent by the MCC 200, receiving information from energy providers regarding energy supply and demand and customer energy usage and billing, receiving information from Telecommunications Service Gateways which send email as output, and receiving information from external service providers, such as weather archives 10.

Certain embodiments of the invention include a Web Client 280 in the MCC 200. The Web Client 280 is used by the MCC 200 to initiate HTTP transactions with other system components that are HTTP compliant. For example, the Web Client 280 may interact with the Premises Equipment 300 where the MCC 200 initiates some information transfer or service request to such equipment, request and receive information from the energy provider 20 where such information is available via an HTTP compliant Web Server, request and receive information from an external service provider such as weather archives 10, where such information is available via an HTTP compliant Web Server, and request and receive information from a Telecommunications Gateway Service, where such service is available through an HTTP compliant Web Server.

The embodiment of FIG. 3 further includes a Web Server 290 as one of the communication protocol interfaces of the MCC 200. The Web Server 290 is used by the MCC 200 to respond to HTTP formatted requests and send HTTP formatted information to other HTTP compliant entities in the system. Such information may include interactions with users who utilize a Web browser to request and receive information and system changes from the MCC 200, interactions with the energy provider 20, where such provider utilizes an HTTP compliant Web client function to request and receive information from the MCC 200 and to send asynchronous updates to the MCC 200, interactions with an external service provider such as weather archives 10, where such provider utilizes an HTTP compliant Web client function to send asynchronous updates to the MCC 200, interactions with HTTP compliant Telecommunications Service Providers, where such providers utilize a Web client interface to send information regarding the energy provider's services to the MCC 200.

It is to be noted, also, that Premises Equipment 300 may be HTTP compliant and communication between MCC 200 and Premises Equipment 300 may be conducted in accordance therewith.

Figure 4:
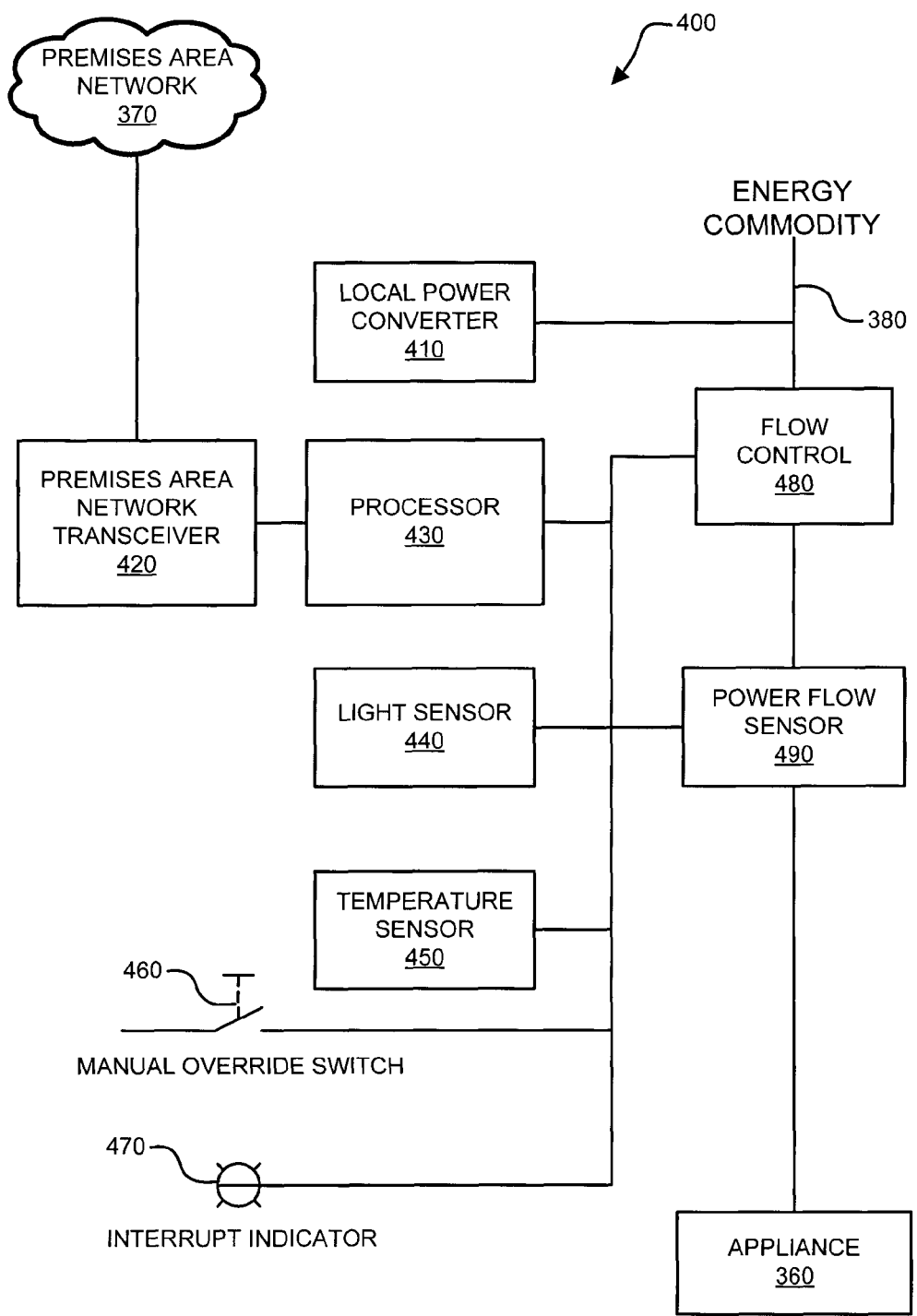
FIG. 4 is a block diagram of an exemplary configuration of internal components to embody a Communicating Appliance Interface consistent with the present invention.

FIG. 4 depicts an exemplary embodiment of a Communicating Appliance Interface (CAI) 400 consistent with the present invention. In certain embodiments, the energy-consuming appliance 360 is connected to the CAI 400 in the same manner in which such appliance would ordinarily connect to the corresponding energy supply 380 if the CAI 400 were not present. For example, the connection to the appliance at the CAI may be made via a plug and socket arrangement, typical of "plug in" appliances, the connection to the appliance may be made via an electrical connection of the associated electrical wires, typical of "hard wired" appliances, which connect directly to the premises wiring without a plug and socket, or by the plumbing of a gas fitting to a gas powered appliance. Similarly, the CAI 400 is also connected to the energy supply system 380 in a manner in which the associated appliance connection would be made to the energy supply system 380 if the CAI 400 were not present. The CAI 400 is also connected to other devices within the premises, including the Premises Control Communications Gateway 310, via a Premises Area Network 370. In certain embodiments, however, the CAI 400 may communicate in accordance with the network communication protocol of the communication network 110, in which case the CAI 400 is coupled directly to the wide area network 110 over which the CAI 400 could interact directly with the MCC 200.

As is shown in FIG. 4, the CAI 400 includes a Local Power Converter 410 connected to the energy supply system 380 to provide local system power to components of the CAI 400. It is to be noted that the connections to Local Power Converter 410 by the other components of CAI 400 are omitted for clarity in the Figure. The energy supply system 380 may be additionally connected to a flow control device 480 for controlling the amount of the energy commodity provided to the appliance 360. The flow control device may be a simple interrupt relay or switch or, in the case of gas, a valve, or may be a switch or valve that is controlled through a waveform, such as through a suitable controller. The flow control device 480 controls the flow of the energy commodity from the supply 380 to the appliance 360 under the control of the CAI 400.

In certain embodiments, the supplied energy commodity may be monitored through an optional Power Flow Sensor 490, which measures the flow of energy from the energy supply system 380 to the appliance 360, and may obtain various metrics pertaining to the quality of the energy supply. The Power Flow Sensor 490 relays this information to the other components in the CAI 400.

The CAI 400 may optionally include any of a number of indicators, audio and visual, to provide an indication of the status of the corresponding appliance 360 or other aspects of the system. For example, the indicator may be an Interrupt Indicator 470 to provide an indication, audibly, visually or both, to the user when the energy supply to the appliance 360 is being interrupted.

The CAI 400 may optionally include any of a number of user controls to control various operational aspects of the appliance 360, to modify the function being performed by the CAI 400 or to provide input to the system for some other aspect of system control. For example, as is shown in FIG. 4, a Manual Override Switch 460 is activated when the user desires to change the supply state of the energy commodity to the connected appliance 360. The CAI 400 may also include one or more optional sensors to measure environmental or occupancy conditions in and around the CAI 400. The sensors of illustrated in FIG. 4 are similar to those previously described, however the sensors in the CAI 400 may not require equipment for formatting the data to meet the communication protocol of the communication network. For example, an optional Light Sensor 440 may be included to measure the amount of light present at the CAI 400 and to report the amount to the other components within the CAI 400. An optional Temperature Sensor 450 may be included to measure the ambient temperature at the CAI 400 and report this to the other components with the CAI 400.

CAI 400 may include a Processor Unit 430 for carrying out certain functional and control features. This component may be implemented in the form of an embedded microprocessor executing processor code held in a persistent storage device (not shown). Alternatively, the processing functions may be implemented in discrete circuitry or some combination of a microprocessor and discrete circuitry. The Processor Unit 430 implements the logic to facilitate communications and operation of the CAI 400, such as interrupting and restoring energy to the connected appliance 360, including implementing a controller function, monitoring energy usage by the connected appliance 360, processing values obtained by sensors in the CAI 400 for forwarding to other CAI functions and for communicating such values to other entities in the system, receiving and processing inputs from a user of the CAI 400, controlling other CAI 400 components and to provide status indications of the connected appliance 360, executing functions to control the connected appliance in accordance with some logic which has been requested by the occupants, end consumer, energy provider or other entity. The functions described are easily implemented in accordance on a per-application basis, such as by programming such functionality and executing programming instructions on the Processor Unit 430.

The CAI 400 may include a Premises Area Network Transceiver 420 suitable to facilitate communications between the CAI 400 and other system components. The Premises Area Network Transceiver 420 may be coupled to the Premises Area Network 370 in a suitable manner, including wirelessly.

Figure 5:
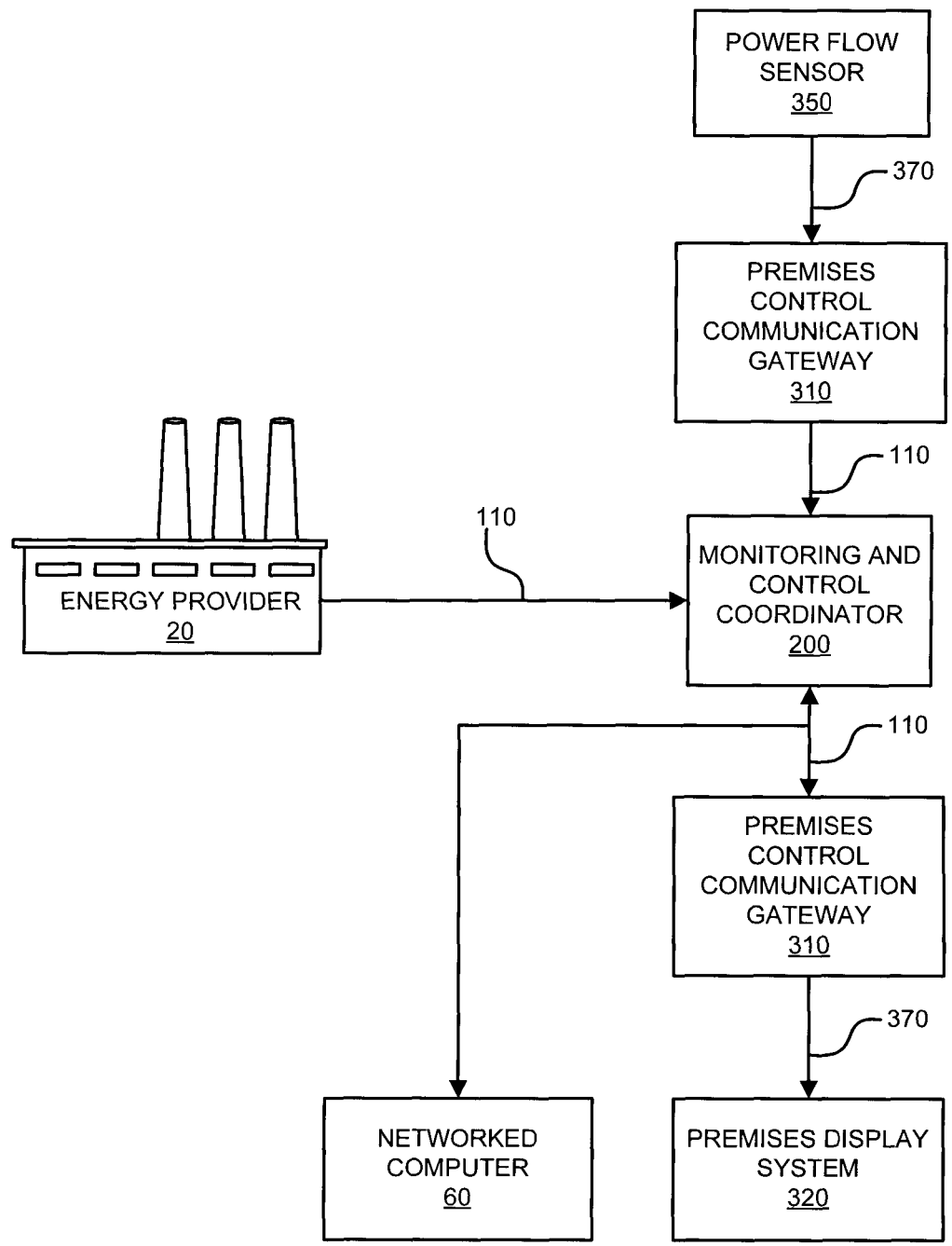
FIG. 5 is a system flow diagram depicting real-time energy usage determination in accordance with the present invention.

FIG. 5 depicts a flow diagram illustrative of certain features of the present invention. In the example shown in the Figure, real-time energy usage information is provided to the consumer. One or more Power Flow Sensors 350 at the target premises collect information regarding the amount of energy being consumed by individual energy-consuming appliances and by the premises as a whole. This information is transmitted via the Premises Area Network 370 to the Premises Control Communications Gateway 310 and then to the Monitoring and Control Coordinator 200 via the communication network 110. Data pertaining to the price of the energy commodity for particular premises originates at the energy provider 20 and is transmitted to the MCC 200 via the communication network 110. The MCC 200 utilizes the information provided by the Power Flow Sensor and energy provider to calculate the amount of energy being consumed at the premises as well as the cost of that energy. This usage information is calculated in the MCC 200 and presented in various formats including, but not limited to instantaneous energy being consumed expressed in units of power, extrapolated hourly, daily, weekly, monthly, semi-annual and/or annual energy consumption expressed in units of power, and extrapolated hourly, daily, weekly and monthly energy consumption expressed in units of currency based on the energy pricing information provided by the energy provider 20. This information is transmitted via the communication network 110 to one or more networked computers 60 located within and/or outside the premises. Additionally, this usage information is transmitted via the communication network 110 to a Premises Control Communications Gateway 310 then via the Premises Area Network 370 to one or more Premises Display Systems 320. The user can select between the different display formats as desired. As the amount of energy being consumed on the premises changes, such changes are relayed to the consumer in real-time to the various displays. Similarly, if changes are made to the price of energy by the energy provider 20, such changes are relayed in real-time and may be displayed in units of currency and further action may be initiated by the system in response to such changes to alter the rate of consumption.

In addition to the monitoring and display of energy usage by appliances, which are stationary within the premises, certain embodiments of the invention facilitates the monitoring and display of energy usage by motor vehicles and other mobile energy-consuming equipment. Such equipment may be connected to a Communicating Appliance Interface (CAI) 400, which, in turn, communicates via a Premises Area Network 370 to other elements of the system periodically, when such equipment is in proximity to the premises.

Figure 6:
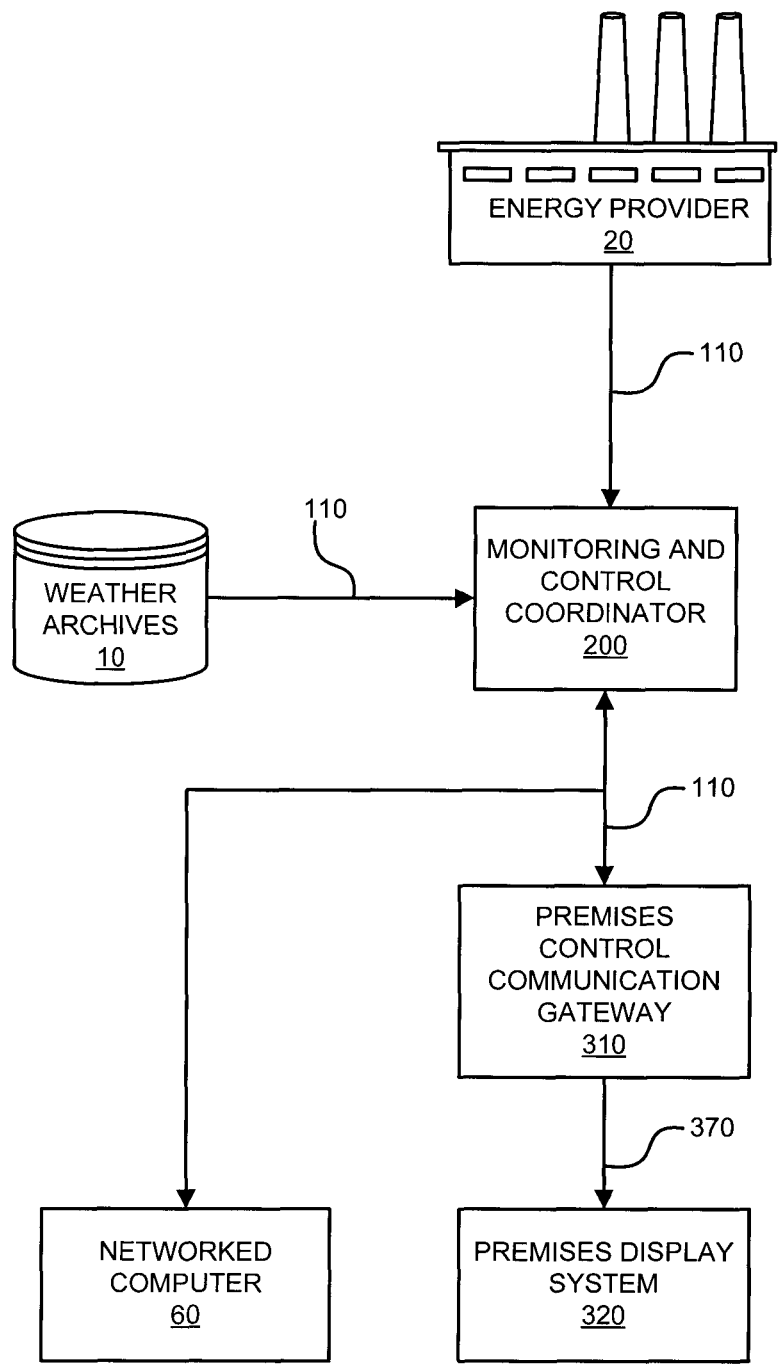
FIG. 6 is a system flow diagram depicting energy savings determination in accordance with the present invention.

Referring to FIG. 6, there is shown a flow diagram of an exemplary feature of the invention that calculates and displays information to end users regarding the nature and amount of energy savings associated with the use of the system. Energy savings is calculated as the amount of energy used per appliance and/or at the premises as a whole utilizing the system as compared to the amount of energy used per appliance and/or at the premises as a whole prior to installation and use of the system.

As is shown in the Figure, current and historical weather information for the location of the target premises is transmitted from a Weather Archives 10 to the MCC 200 via the communication network 110. The information may include the average daily temperature for the location for particular requested dates, past and present. Such information is sorted and stored in the MCC 200 and is used in subsequent calculations. Current and historical billing information for a target premises is transmitted to the MCC 200 from the energy provider 20 via the communication network 110. The billing information is sorted and stored by the MCC 200 and is also used in the subsequent calculations. When the system is first enabled or at any selected time thereafter, the MCC 200 calculates the energy consumption per billing period for the billing periods associated with the twelve (12) calendar months prior to the installation of the system at the target premises. The calculations will be described further with regard to FIG. 8. Once the calculations have been made, the energy savings data are transmitted by the MCC 200 to various display devices. Savings information can be transmitted to one or more networked computers 60, located on premises and/or off premises via the communication network 110. Additionally, the MCC 200 can transmit savings information via the communication network 110 to an optional Premises Control Communications Gateway 310, which can further transmit the data via the Premises Area Network 370 to one or more Premises Display Systems 320. The savings information may be displayed to the consumer in various forms including, but not limited to actual energy saved during the preceding target period expressed in units of power, extrapolated weekly, monthly, semi-annual and/or annual energy savings expressed in units of power, Green House Gas (GHG) emissions savings during the preceding target period expressed in weight and/or volume of GHG, extrapolated weekly, monthly, semi-animal, annual and/or lifetime GHG emissions savings expressed in weight and/or volume of GHG, GHG equivalencies, e.g., number of cars that would produce the same volume of GHG, for the energy saved during the preceding target period expressed in units of appropriate to each equivalency, e.g., number of cars, number of trees, etc., and/or extrapolated weekly, monthly, semi-annual, annual, and/or lifetime GHG equivalencies for the energy saved expressed in units appropriate to each equivalency.

Figure 7A:
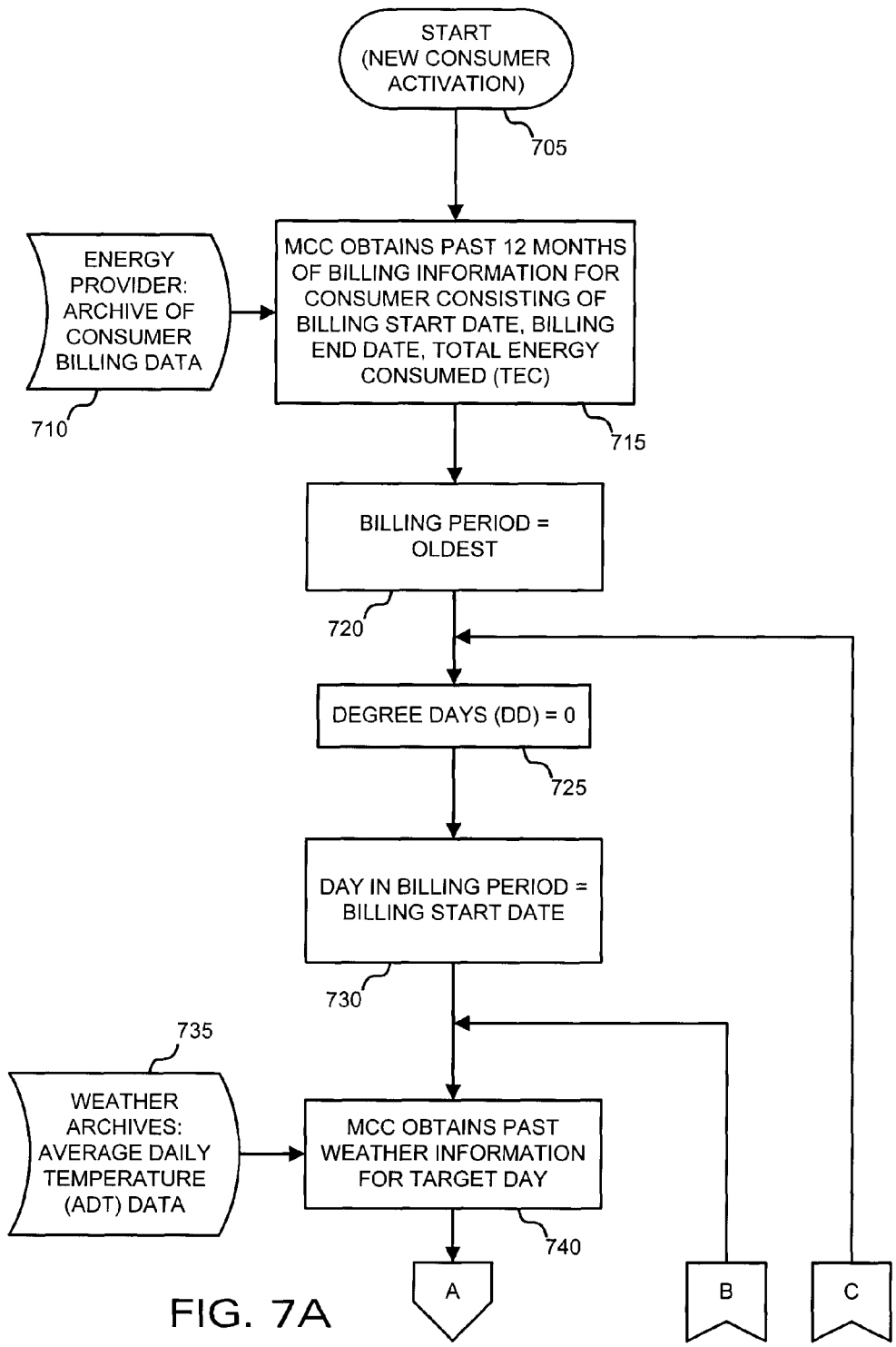
FIGS. 7A-7B is a process flow diagram depicting baseline energy information determination in accordance with the present invention.
Figure 7B:
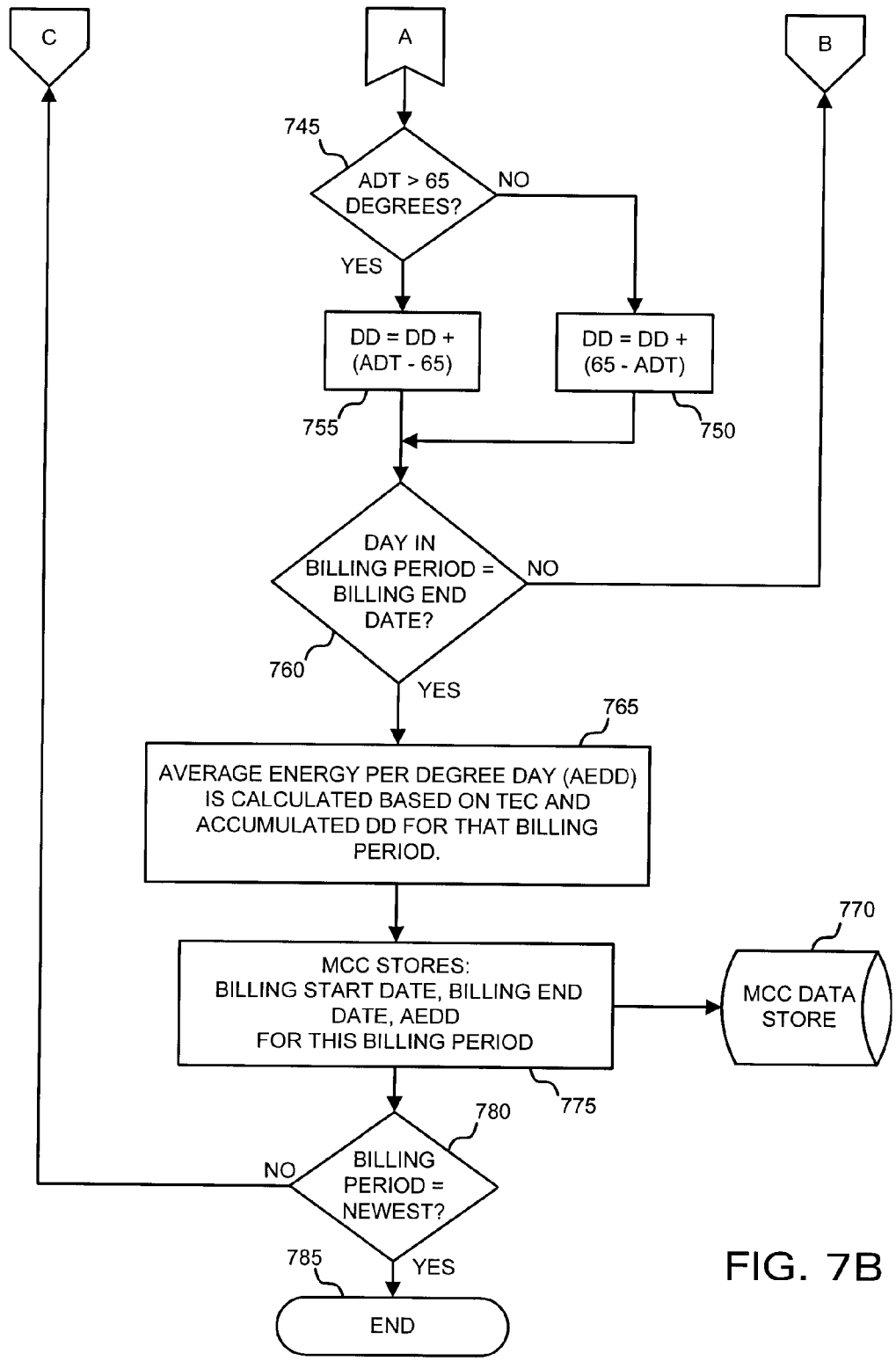

Referring to FIGS. 7A-7B, there is shown by way of a flow diagram various calculations performed to establish a consumer's baseline energy usage from previous billing data, normalized for weather. The process is entered at block 705, where a consumer activates the service with the energy provider. Process flow proceeds to block 715, where the MCC 200 retrieves archived billing data, indicated at block 710, for a predetermined period of time, for example, twelve (12) months. Billing periods are defined by the energy provider 20 and each billing period is identified by a billing start date and a billing end date. Beginning with the oldest billing period, as initialized at block 720, and beginning with the start date of the billing period, as initialized at block 730, the MCC 200 obtains from the weather archives 10, as indicated at block 735, the weather data for the day being evaluated, as shown at block 740. The number of Degree Days (DD) for the billing period, which indicates variability in temperature about some predetermined benchmark temperature and is initialized to zero at block 725, is computed as the accumulation of the DD associated with each day in the billing period. This computation is shown in the process steps illustrated in FIG. 7B. At block 745, it is first determined if the Average Daily Temperature (ADT) for the date being evaluated is greater than the benchmark temperature, which in the exemplary embodiment shown is 65° F. The MCC 200 determines DD for each day by calculating the absolute value of the difference between the ADT and the benchmark temperature, which is depicted in the subtraction operations in blocks 750 and 755, where the resulting value is then added to the running total of DD. It is then determined at block 760 if all days for the current billing period have been evaluated and, if not, the next day is retrieved at block 740. If all days have been evaluated, process flow is transferred to block 765, where the MCC 200 calculates the Average Energy per Degree Day (AEDD) based on the Total Energy Consumed (TEC) obtained from the billing information and from the accumulated DD. Such calculations vary by application and may include statistical techniques, such as regression analysis. The present invention is intended to encompass all such computational techniques.

In block 755, the MCC 200 sorts the billing start date, the billing end date, and the AEDD for the billing period and the data are stored in the MCC data store 210, as indicated at block 770. It is then determined if all billing periods in the twelve (12) calendar month evaluation period have been scrutinized, as shown at block 780. If the latest billing period has been evaluated, then the process ends at block 785. If another month is to be scrutinized, the procedure returns to block 725, where the next month's data is processed. The data stored at the MCC 200 are used in subsequent calculations, as is described below.

Figure 8:
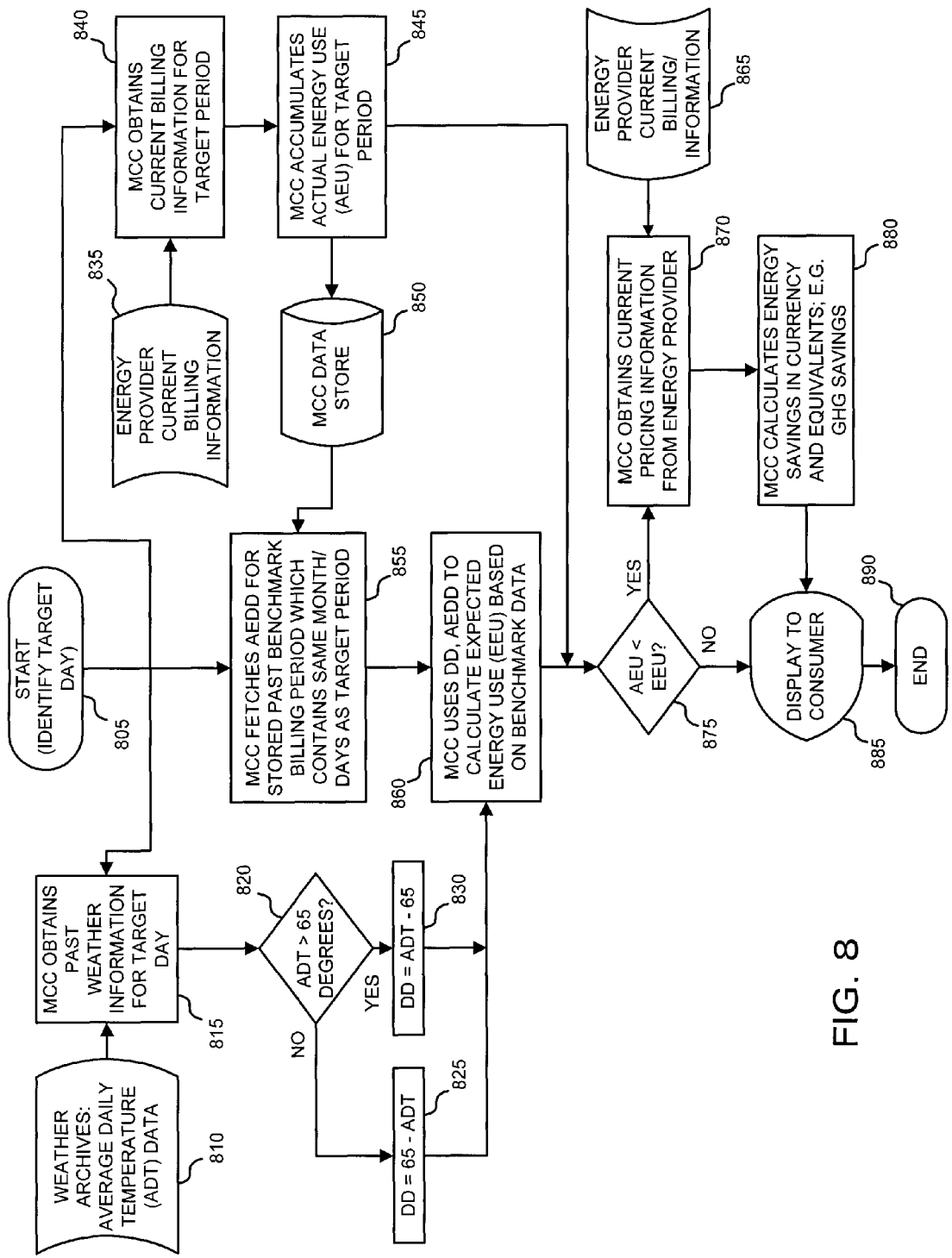
FIG. 8 is a process flow diagram depicting energy savings determination in accordance with the present invention.

Referring to FIG. 8, there is shown a process flow chart of certain calculations to determine a consumer's energy savings by applying the measures afforded by the present invention. At the conclusion of any day, for example, as indicated at block 805, the MCC 200 obtains weather data for the day from the weather archive, as indicated at block 815, such as Average Daily Temperature (ADT) for the day stored at the weather archive, as is indicated at block 810. The value DD for each day of the target period is computed as the absolute value of the difference between the ADT and the benchmark temperature, as indicated at blocks 820, 825 and 830. Additionally, the MCC 200 obtains the current billing information for the target billing period, as indicated at block 840, from the energy provider 20, as indicated at block 835. The MCC 200 maintains a cumulative measure of the Actual Energy Used (AEU), as shown at block 845, and stores that total in the data store 210, as shown at block 850. The AEU may be determined from information derived from monitored appliances as well as current billing information obtained from the energy provider 20. The MCC 200 then retrieves the AEDD from the data store 210, as indicated at block 855, where the benchmark AEDD was that previously described with regard to FIGS. 7A-7B. The MCC 200 then uses the AEDD for the specified billing period to calculate the consumer's Expected Energy Use (EEU) based on the target period's accumulated DD of the day preceding the target day, as shown at block 860. If the AEU is not less than the EEU for the target day, as determined at block 875, the AEU and the EEU, and other pertinent parameters are displayed to the user, as shown at block 855. If, however, the AEU is less than the EEU for the target day, the MCC 200 obtains the current price of the energy commodity, as shown at block 870, from the energy provider 20, as shown at block 865. The MCC 200 may then, as shown at block 880, calculate the energy savings in terms of currency or some equivalent savings measure, such as savings in Green House Gas (GHG) emissions. The savings information is then displayed to the user at block 885 and the process ends at block 890. Savings of money is calculated by the MCC 200 by applying the energy provider's 20 current and/or past energy pricing information to the energy used. Savings of GHG emissions are calculated by the MCC 200 by determining the amount of GHG that is emitted per energy unit produced by the energy provider 20 and then multiplying that amount by the energy savings. GHG equivalencies are calculated by applying specific conversion factors appropriate to each equivalency and as determined by scientific information generally available. GHG equivalency information may include the number of trees associated with the eradication of a unit of GHG emissions or the number of cars associated with the creation of a unit of GHG emissions. Other such equivalencies may be presented as well.

In certain embodiments of the invention, fully automated climate control of the premises, e.g., heating and air conditioning, is implemented and is controllable both locally to the premises as well as from a remote location through the communication network 110. Similarly, heating of domestic water at the premises, such as through a domestic water heater, may be controlled by the invention. A water heater and/or Heating, Ventilating and Air Conditioning (HVAC) equipment may respectively comprise a controlled appliance 360a-360b, as shown in FIG. 2. A corresponding CAI 400a-400b is respectively connected to the water heater 360a and HVAC equipment 360b to control and monitor the energy flow and operation of each piece of equipment. A Temperature Sensor 340 measures the ambient temperature at one or more specific locations within the premises. The Premises Equipment 300, as installed in the system of FIG. 1, is in communication with MCC 200 via communication network 110. The MCC 200 receives input from and sends display information other components on the network 110, as described above, where such components include, but are not limited to, a networked computer 60 located on and off the target premises, a landline telephone 50, a cell phone 40, and a PDA 30 via one or more Telecommunications Service Gateways 90, 100.

Manual control of the HVAC equipment can be affected locally at the premises or remotely at any of the aforementioned communications devices. At the premises, local control can take place at the CAI 400 through the interface described above. Additional local control may be achieved through the interface implemented on networked computers 60 located on the premises. Remote control Premises Equipment may be achieved via an interface implemented on a networked computers 60 located somewhere other than the premises through the communication network 110. Additionally, control of the equipment may be achieved via audio interaction on landline telephones 50 and cell phones 40 through the IVR Gateway 100, or may be achieved through the exchange of properly formatted text messages via an SMS compliant cell phone 40 or PDA 30 via the SMS Gateway 70. SMS control may consist of a user originating or responding to a message in accordance with a syntax known by the MCC 200. The user, for example, may respond in a simple manner to a query generated by the MCC 200 and formatted in compliance with SMS. A response may be, for example, a "yes/no" binary response or a value of a particular setting, such as a set point temperature. The number and type of messages vary by application and the present invention is not limited to particular implementations.

Automatic control of the HVAC equipment, and similarly the water heater, may be achieved through Premises Equipment Interface Logic 240 in the MCC 200. The end user may program various heating and cooling profiles through manipulation of controls implemented by User Interface Logic 230 and settings may be maintained in a suitable format in memory. The MCC 200 stores the programming information in Data Store 210 and at the request of the user, automatically controls the functions of the HVAC system according to the user's instructions and/or preferences, and including such measured features as the available power flowing through the flow control device 480. Such programming may include instructions and setting to operate the HVAC equipment to achieve and maintain a desired temperature within the premises or to operate the HVAC equipment to limit energy use by the equipment. Such programming may automatically change the desired temperature of the premises and/or the desired energy use of the HVAC equipment based on the status of one or more external criteria such as the time of day, the local weather conditions, the cost of energy, the open/closed state of the doors and windows within the premises and presence or absence of occupants.

In an exemplary embodiment, the programming of automated HVAC equipment operation is achieved through a Web browser on a networked computer 60. The end user is given a menu of choices for programming the desired premises temperature or HVAC energy use according to a calendar-based schedule and/or in response to certain events, such as a change in the price of energy. Periodically, an energy provider 20 may change the price of the energy commodity in response to rapidly fluctuating energy supplier prices. In addition, the energy provider 20 may change the price of the energy commodity to discourage energy use during periods where energy demand approaches the energy supply. Such event-based price changes are transmitted from the energy provider 20 to the MCC 200, where the information is used to automatically modify the HVAC equipment programming according to some set of preferences or rules established by the consumer and conveyed to the system. Another example of an event is when the amount of energy use by the HVAC equipment over a certain time period exceeds some predetermined threshold. This energy use information is available via a Power Flow Sensor 350 monitoring the entire premises a Power Flow Sensor 490 at an individual appliance.

In certain embodiments of the invention, the HVAC equipment is controlled by the present invention to pre-cool and/or pre-heat the premises during periods of the day when the cost of the energy commodity is at a minimum or below some threshold. Conversely, the HVAC equipment may be controlled by the invention to avoid operation during periods of the day that have higher energy costs. Automated control of the HVAC equipment may also include the ability to control individual HVAC components that use less energy, such as a fan, to achieve or extend the maintenance of a desired temperature in the premises so as to avoid or delay the operation of HVAC components that use more energy, such as the air-conditioner compressor.

In addition to automatically modifying the operation of the HVAC equipment based on certain pre-identified events, certain embodiments of the invention optionally notify the end user of the events, such as through a remote device, so that the end user can confirm their desire to allow a programming change responsive to such events.

Certain embodiments of the invention control pool and spa filtration systems to achieve filtration at a desired level of sanitation of the pool or spa water. In such embodiments, Premises Equipment 300 includes the pool/spa filtration equipment as an appliance 360. A CAI 400 is connected to the pool/spa filtration equipment to control and monitor the energy flow and operation of the equipment. One or more Temperature Sensors 340 measure the ambient temperature at one or more specific locations in proximity to the pool or spa and optionally the temperature of the water. The Premises Equipment 300 communicates to the MCC 200 via the communication network 110 and the MCC 200 receives input from and sends display information to end users via the networks and end communications devices previously described. The control, monitoring and programming may be achieved in a manner similar to that of the HVAC embodiment described above with the exception that the target parameters apply to sanitation as opposed to premises temperature, although water temperature may be a controlled parameter of the pool/spa.

Certain embodiments of the invention may control energy consuming appliances to reduce or eliminate unnecessary operation or certain operational functions of the appliance, such as when the consumer is not occupying the premises or when the cost of the energy commodity exceeds some predetermined threshold.

The invention may also be embodied to control energy-consuming appliances to facilitate an aggregated reduction in energy demand responsive to a predicted or measured shortage or margin between energy supply and demand. For example, the system may allow the energy provider 20 to transmit information and make information available to the MCC 200 regarding the timing and severity of the shortage, target amounts of the energy commodity to be reduced and the localities affected. The Energy Provider Interface Logic 250 may include process instructions that specify target energy-consuming appliances in particular premises that may be controlled in a manner to achieve the demand reduction target. The MCC 200 may retrieve information from the Data Store 210 specifying locations of consumers and recent appliance activity, consumer preferences, and consumer contractual obligations that identify target premises within the targeted localities and particular target appliances within target premises. The MCC 200 may solicit and receive information from individual CAIs 400, which are connected to target appliances, to determine current energy consumption status of the attached appliance. Targeted appliances that are actually in use can be identified and controlled to meet demand reduction target ranges with high correlation between the actual amount of energy reduction achieved by interruption of energy to the identified target appliances and a predicted amount of that energy reduction. This facilitates greater accuracy in an aggregated reduction in energy demand given a specific demand reduction target from the energy provider.

At the commencement of any energy supply shortage period, the MCC 200 may transmit information to the CAIs 400 of the targeted appliances to interrupt the energy to each appliance. The MCC 200 may then continually monitor the status of the energy consumption by each target appliance at each target premises to detect compliance to the energy interruption transmission and to facilitate the detection of any command override made by a consumer to resume operation of a targeted appliance. Upon overriding the energy interruption on a targeted appliance by a consumer, the MCC 200 may identify a new target appliance at either the same or a different target premises and interrupt energy to the new target appliance to offset the energy demand reduction not achieved by the original targeted appliance. In this manner, the reduction target of the energy provider 20 may be maintained, thereby automatically ameliorating individual non-compliant consumers or other time-varying factors which may affect the demand of energy.

At the conclusion of the energy supply margin shortage, the control of each energy-consuming device returns to the state it was in prior to the energy supply margin shortage period. The MCC 200 may employ procedures for "staggering" the resumption of energy at those targeted appliances that have had their energy interrupted. In this manner, the energy supply system will not overloaded by the inrush demand of simultaneously energized systems.

The invention may also cooperate with third party service providers that are not energy related, such as home security providers. As described above, the invention monitors various aspects of the premises such as the open/close status of doors and windows, the presence of audio activity, and the presence of occupants, where such information may indicate the occupancy status of the premises. Such information may be transmitted to the home security provider via a suitable interface at the MCC 200.

The descriptions above are intended to illustrate possible implementations of the present invention and are not restrictive. Many variations, modifications and alternatives will become apparent to the skilled artisan upon review of this disclosure. For example, components equivalent to those shown and described may be substituted therefor, elements and methods individually described may be combined, and elements described as discrete may be distributed across many components. The scope of the invention should therefore be determined not with reference to the description above, but with reference to the appended Claims, along with their frill range of equivalents.

What is claimed is:

1. An energy management system for managing consumption of an energy commodity by energy-consuming devices at premises, the energy commodity being provided to the premises by an energy provider, the system comprising:
    a plurality of appliance interfaces each respectively coupled to a corresponding one of the devices and monitoring a corresponding rate of consumption of the energy commodity provided thereto, the appliance interfaces coupled one to another via a communication network;
    a monitoring and control coordinator coupled to said communication network and to another communication network, said monitoring and control coordinator receiving from each of said appliance interfaces over said communication network status information that includes an indication of said corresponding rate of consumption and transmitting to each of said appliance interfaces over said communication network corresponding control information for controlling said corresponding rate of consumption, wherein said control information corresponds to information received at said monitoring and control coordinator over said other communication network; and
    a premises control communication gateway in communication with the monitoring and control coordinator and the plurality of appliance interfaces, wherein said premises control communication gateway distributes monitoring and control data through a premises area network to communicating appliance interfaces;
    wherein said monitoring and control coordinator comprises:
        user interface logic for formatting information for presentation to the user and soliciting information from the user;
        premises equipment interface logic for providing instruction to and receiving information from the appliance interfaces; and
        energy provider logic for providing interaction between the monitoring and control coordinator and a data interface at the energy provider.

2. The energy management system as recited in claim 1 including a user interface executing on an external device coupled to said monitoring and control coordinator through said other communication network, wherein said control information for controlling said rate of consumption of the energy commodity originates from said external device.

3. The energy management system as recited in claim 2, wherein said other communication network includes a network communication gateway for receiving said control information from said external device in a format other than that of a network communication protocol of said other communication network.

4. The energy management system as recited in claim 1, wherein said monitoring and control coordinator is coupled to the energy provider over said other communication network and receiving an indication of a current price of the energy commodity therefrom.

5. The energy management system as recited in claim 4, wherein said monitoring and control coordinator periodically receives an updated current price of the energy commodity.

6. The energy management system as recited in claim 1, wherein said monitoring and control coordinator is coupled to an archive of weather data over said other communication network and receiving historical weather data therefrom.

7. The energy management system as recited in claim 1, wherein said communication network and said other communication network operate under a common network communication protocol.

8. An energy management system for managing consumption of an energy commodity by energy-consuming devices at premises, the energy commodity being provided to the premises by an energy provider, the system comprising:
    a plurality of appliance interfaces each respectively coupled to a corresponding one of the devices and controlling said consumption of said energy commodity by said corresponding device responsive to control information provided thereto;
    a monitoring and control coordinator coupled to said plurality of appliance interfaces through a local communication network and providing to each of said appliance interfaces said control information, said control information determined from external information provided to said monitoring and control coordinator; wherein said monitoring and control coordinator comprises:
- user interface logic for formatting information for presentation to the user and soliciting information from the user;
- premises equipment interface logic for providing instruction to and receiving information from the appliance interfaces; and
- energy provider logic for providing interaction between the monitoring and control coordinator and a data interface at the energy provider; and a network communication device coupled to said monitoring and control coordinator through a wide area communication network and transmitting said external information thereto.

9. The energy management system recited in claim 8, wherein said network communication device transmits a current price of the energy commodity in said external information.

10. The energy management system as recited in claim 8, wherein said network communication device transmits historical weather data in said external information.

11. The energy management system as recited in claim 8 further including a communication network gateway between said network communication device and said monitoring and control coordinator, said network communication device transmitting said external information in accordance with a communication protocol other than a communication protocol of said wide area communication network.

12. The energy management as recited in claim 11, wherein said external information is formatted in accordance with a short messaging service protocol.

13. The energy management system as recited in claim 11, wherein said external information is formatted in accordance with an interactive voice response protocol.

14. The energy management system as recited in claim 8, wherein said network communication device is a computing device executing a communication application operative in accordance with an information passing protocol.

15. The energy management system as recited in claim 14, wherein said application is operative with any of a hypertext transfer protocol, a simple mail transfer protocol, a file transfer protocol and a post office protocol.

16. A method for managing consumption of an energy commodity by energy-consuming devices at premises comprising:
acquiring via a communication network by a monitoring and control coordinator information pertaining to the consumption of the energy commodity; wherein said monitoring and control coordinator comprises:
- user interface logic for formatting information for presentation to the user and soliciting information from the user;
- premises equipment interface logic for providing instruction to and receiving information from the appliance interfaces; and
- energy provider logic for providing interaction between the monitoring and control coordinator and a data interface at the energy provider;

transmitting from said monitoring and control coordinator control information to a plurality of appliance interfaces each respectively coupled to a corresponding one of the devices, said control information determined from said acquired information; and controlling the consumption of the energy commodity of at least one of the devices in accordance with said control information.

17. The method for managing consumption of an energy commodity as recited in claim 16, where said information acquiring step includes the step of acquiring as said acquired information any of a price of the energy commodity, historical weather data, energy commodity billing information and current consumer energy commodity consumption information.

18. The method for managing consumption of an energy commodity as recited in claim 16, where said information acquiring step includes the step of acquiring an energy demand reduction instruction.

19. The method for managing consumption of an energy commodity as recited in claim 18, where said commodity consumption controlling step includes interrupting a supply of the energy commodity at said at least one device responsive to said energy demand reduction instruction.

20. The method for managing consumption of an energy commodity as recited in claim 19 further including the step of detecting if said interruption of said supply of the energy commodity has been overridden and responsive thereto interrupting a supply of the energy commodity at another device responsive to said energy demand reduction instruction.

21. The method for managing consumption of an energy commodity as recited in claim 16, where said monitoring and control coordinator calculates energy savings in terms of Green House Gas emissions.

\* \* \* \* \*